Figure 1:
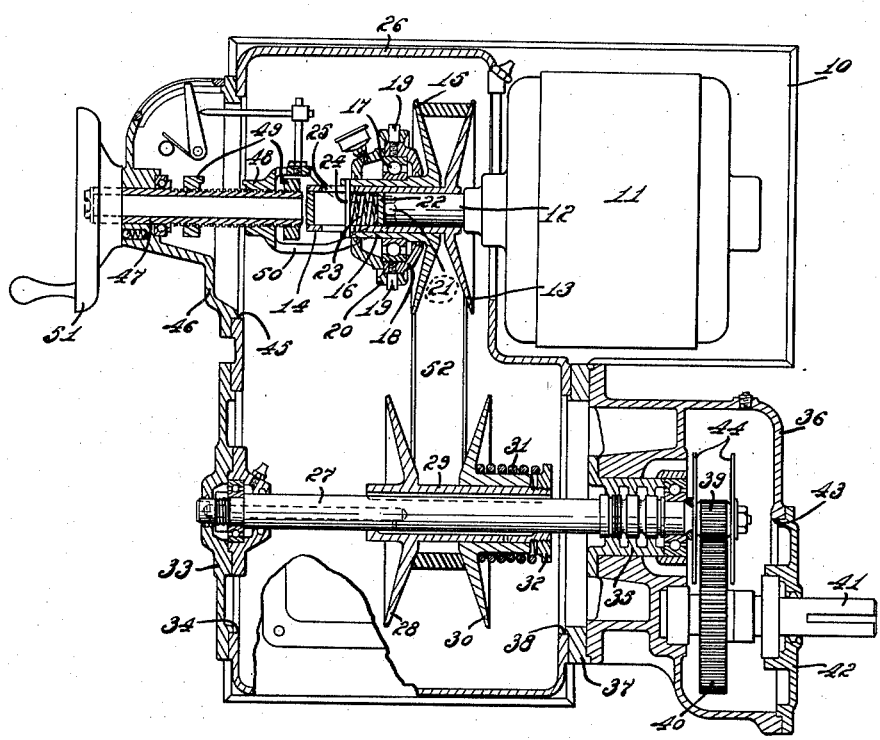

Sept. 24, 1940.       P. B. REEVES       2,215,742
VARIABLE TRANSMISSION
Filed Feb. 14, 1938

INVENTOR.
Paul B. Reeves,
BY
Hood + Hahn.
ATTORNEYS.

Patented Sept. 24, 1940

2,215,742

UNITED STATES PATENT OFFICE 2,215,742

VARIABLE TRANSMISSION

Paul B. Reeves, Columbus, Ind., assignor to Reeves Pulley Company, Columbus, Ind., a corporation of Indiana Application February 14, 1938, Serial No. 190,425

3 Claims. (Cl. 74—230.17)

The present application relates to a variable transmission, and more particularly to a transmission of the type in which the output speed is variable by variations in the effective diameters of driving and driven pulleys of the coned disc V type. The primary object of the invention is to improve the manipulating means for transmissions of that character. Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Figure 2:
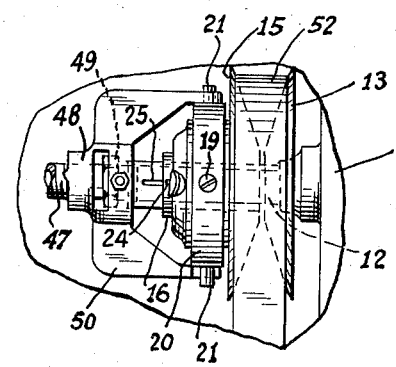

Fig. 1 is a plan, partially in section, of a device constructed in accordance with the invention; and Fig. 2 is a fragmentary view taken on a plane 90° removed from the plane of Fig. 1.

Referring more particularly to the drawing, it will be seen that I have illustrated a base 10 upon which is supported a motor 11 having a spindle 12 to which is fixed a coned disc 13 provided with an elongated hollow hub 14 projecting axially from the coned face of said disc. A mating coned disc 15 is slidably but non-rotatably mounted upon the hub 14 and is provided with an elongated hub 16 projecting from its rear face.

The hub 16 mounts an anti-friction bearing 17 which is enclosed in a bearing housing 18. Said bearing housing carries a pair of diametrically oppositely projecting pins 19 upon which is swivelled an equalizer ring 20. Said ring 20 carries a pair of diametrically oppositely projecting pins 21, the common axis of which is substantially perpendicular to the common axis of the pins 19.

Within the hollow hub 14 is received a plate 22 which abuts the end of the motor spindle 12, and which forms an abutment for one end of a coiled spring 23, likewise received within the hub 14. A pin 24, carried by the hub 16, extends through the hub 14, being positioned within elongated slots 25 formed in said hub 14. It will be apparent that this arrangement is such as to cause the spring 23 constantly to urge the disc 15 away from the disc 13.

An enclosing housing 26 is mounted upon the base 10 and encloses not only the pulley structure above described but also a driven shaft 27 upon which is fixed a coned disc 28 provided with an elongated hub 29 projecting from the coned face thereof. A mating coned disc 30 is slidably but non-rotatably mounted upon the hub 29 and is constantly urged toward the disc 28 by a coiled spring 31, one end of which bears upon the disc 30 and the other end of which bears upon a stop collar 32 threadedly mounted upon the extremity of the hub 29. One end of the shaft 27 is preferably journalled in a bearing carried by a cover plate 33 which closes an aperture 34 in a wall of the casing 26; and the other end of said shaft 27 is carried in bearing means 35 supported in a gear housing 36 which, together with a ring 37, closes an aperture 38 in the opposite wall of the casing 26. Within the housing 36, the shaft 27 carries a pinion 39 meshing with a gear 40 mounted upon an output shaft 41 which has suitable bearing in the housing 36 and in a cover plate 42 closing an aperture 43 in the housing 36. Oil slinger discs 44 are mounted upon the shaft 27 on opposite sides of the pinion 39.

A third aperture 45 in a wall of the casing 26 is closed by a housing 46 in which is rotatably but non-reciprocably mounted a screw shaft 47 which threadedly carries a nut 48. Stop elements 49 are adjustably mounted on the screw shaft on opposite sides of the nut 48. The nut 48 carries yoke arms 50, each of which is formed with a bifurcated end the furcations of each arm embracing one of the pins 21, so that movement of the yoke toward the right in Fig. 1 will be transmitted through the pins 21, ring 20, pins 19, housing 18, and bearing 17, to the disc 15; while movement of the yoke to the left will not be so transmitted but will permit the spring 23 to shift the disc 15 correspondingly toward the left. Thus, there is provided a one-way operative connection between the yoke 48 and the pins 21.

From the above, it will be apparent that the disc 28 and 30 of the driven pulley are constantly urged toward each other by a spring 31, while the discs 13 and 15 are constantly urged away from each other by the spring 23. The parts being in the position illustrated, rotation of the hand-wheel 51 in a counter-clockwise direction, as viewed from the left, will move the nut 48 toward the left, thereby releasing the spring 23 to shift the disc 15 toward the left. Such movement of the disc 15 toward the left is assisted by the action of the spring 31 which, when support is removed from the disc 15 to permit the disc 15 to move to the left, will force the disc 30 toward the left to squeeze the belt 52 outwardly between the discs 28 and 30, thus pulling the belt inwardly between the discs 13 and 15 to assist the spring 23 in moving the disc 15 toward the left.

When the parts are to be returned toward the position illustrated, clockwise rotation of the hand-wheel 51 will force the nut 48 toward the right. The one-way engagement of the yoke arms 50 with the pins 21 will transmit the movement of the nut 48 to the disc 15, thus squeezing the belt 52 outwardly between the discs 13 and 15 and pulling it more deeply into the groove between the discs 28 and 30 to shift the disc 30 to the right. Such movement of the nut 48 must overcome the tendency of the spring 23 and the tendency of the spring 31.

I claim as my invention:

1. A variable speed transmission comprising a first shaft, an expansible pulley mounted on said shaft and comprising a coned disc fixed to said shaft and a mating coned disc axially shiftable with respect thereto, a second shaft, a second expansible pulley mounted on said second shaft and comprising a coned disc fixed to said second shaft and a mating coned disc axially shiftable with respect thereto, a belt providing a driving connection between said pulleys, a spring urging the shiftable disc of one of said pulleys toward its fellow, a spring urging the shiftable disc of the other of said pulleys away from its fellow, and manually manipulable means operable to overcome the tendency of said last-named spring.

2. A variable speed driving unit comprising a motor having a spindle, a coned disc fixed to said spindle with its coned face remote from motor, a hollow hub projecting from said coned face, a mating coned disc slidably but non-rotatably mounted on said hub and having a hub likewise projecting away from said motor, a screw shaft rotatably but non-reciprocably mounted in substantial coaxiality with said spindle, a nut threadedly mounted on said screw shaft and held against rotation, said nut carrying a yoke, a bearing supported upon the hub of said slidable disc, a housing for said bearing, a pair of pins projecting diametrically oppositely from said housing and supporting an equalizer ring, and a pair of pins projecting diametrically oppositely from said equalizer ring upon a common axis substantially perpendicular to the common axis of said first-named pins, said yoke having a one-way connection with said last-named pins.

3. A variable speed driving unit comprising a motor having a spindle, a coned disc fixed to said spindle with its coned face remote from said motor, a hollow hub projecting from said coned face, a mating coned disc slidably but non-rotatably mounted on said hub and having a hub likewise projecting away from said motor, said fixed-disc hub being formed with a longitudinally-extending diametrical slot therethrough, a pin carried by the hub of said slidable disc and positioned in said slot, a spring received in said hollow hub and between said spindle and said pin and tending to separate the same, a screw shaft rotatably but nonreciprocably mounted in substantial coaxiality with said spindle, a nut threadedly mounted on said screw shaft and held against rotation, said nut carrying a yoke, and means operatively connecting said yoke to shift said slidable disc against the tendency of said spring.

PAUL B. REEVES.